Aug. 22, 1939.   G. E. SEIL   2,170,254

REFRACTORY

Original Filed July 1, 1937

INVENTOR
GILBERT E. SEIL,
BY
ATTORNEY.

Patented Aug. 22, 1939

2,170,254

UNITED STATES PATENT OFFICE 2,170,254

REFRACTORY

Gilbert E. Seil, Cynwyd, Pa., assignor to E. J. Lavino and Company, Philadelphia, Pa., a corporation of Delaware Original application July 1, 1937, Serial No. 151,460. Divided and this application November 19, 1937, Serial No. 175,503

8 Claims. (Cl. 72—37)

This patent results from a patent application carved from a main or parent patent application of mine, Serial No. 151,460, filed July 1, 1937. During the prosecution of that main application division was required by the Patent Office on the ground that three separate and independent inventions were disclosed therein. One was held to be for a coating composition. Claims to that invention are to be found in that main patent. Another invention was held to be for a process of coating refractory bodies to cover which a patent application Serial No. 175,502 was filed concurrently herewith. The third invention was held to be for a furnace construction comprising refractory units, and this is being covered by this present patent.

With this as prologue, there now follows the specification as found in said main patent application.

This invention relates to furnace construction and to shaped refractory bodies for use in such construction. More particularly it relates to shaped refractory bodies, such as bricks, having sealing and cementatory adhering coatings and to a novel furnace construction formed of such bodies, as well as to methods of producing the novel furnace construction.

It is one of the objects of the present invention to provide a shaped refractory body, either fired or unfired, having a tough, impervious and substantially moistureproof protective coating which will protect the body from deleterious effects due to handling, moisture, etc.

Another object is to provide a refractory body having an adhering coating which, under the influence of heat, will assume the properties or function of mortar or cement.

A further object of the invention is to provide a furnace construction built up of refractory bodies which, without the use of applied mortar or cement, will approach the condition of a monolithic structure or a structure laid with the use of applied cement.

A still further object is to provide a method of constructing furnaces or furnace refractory linings of shaped refractory bodies, without the aid of applied cement or mortar, in a manner that the structure will approach the condition of a monolithic one or one constructed with the aid of applied cement.

The invention possesses other objects and features of advantage, some of which, with the foregoing, will be set forth in the following description. In the accompanying drawing, for the purpose of example there has been illustrated the best embodiment of the invention now known to me, but such embodiment is to be regarded as typical only of many possible embodiments, and the invention is not to be limited thereto.

Figure 1:
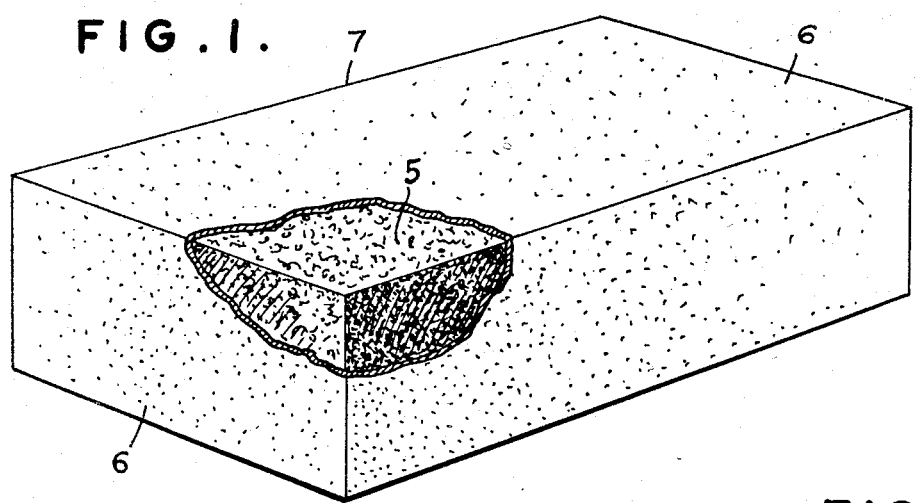
Fig. 1 is a perspective view of a refractory brick having a coating according to one embodiment of the invention, part of the coating being broken away to show its relationship with respect to the brick.

In the manufacture of unburned refractory bodies, such as brick which are sold in the pressed but unfired state, it is necessary to provide a bond which will impart to the brick sufficient physical and chemical stability to permit the handling encountered in loading, storing, installing, etc., and to withstand the thermal shock encountered by the brick before burning in service. It is important that such unfired shapes retain their properties under the action of atmospheric moisture, because the tendency of unburned brick to hydrate and disintegrate when stored under normal conditions is one of the factors retarding their wider application. It is one of the objects of this invention to protect such shapes from alteration under atmospheric conditions. This object is accomplished by the application of a protective coating, which surrounds and adheres to the brick on all sides, and which is in itself substantially resistant to atmospheric changes in temperature and humidity.

The applied protective coating, to be commercially practical, must not only be stable to atmospheric changes in temperature and moisture, but it must also remain unchanged during the handling necessary when the shapes are stored, shipped, installed, etc. The coating must withstand the mechanical shock incident to the various handlings without serious chipping or peeling, and it must withstand the load and heat developed when the brick are stacked in storage without becoming appreciably soft or sticky. Since the brick are often stored twenty or more courses high, the latter is an important consideration. For these reasons the use of coatings which become too brittle, too soft, or too sticky under the conditions prior to heating in the furnace wall is precluded. Thus it is a further object of this invention to apply to refractory shapes which are sold in the unfired state, protective coatings which are substantially unaffected by the mechanical and atmospheric conditions encountered before use in a furnace lining.

It is a still further object of this invention to apply to refractory shapes, either fired or unfired, a cementatory coating, that is a coating which will supply the bond usually obtained by the use of a cement or mortar in furnace wall construction. The method of installation controls both the heat penetration and the slag penetration into the elements used in the construction of refractory furnace linings. In a furnace wall laid dry, that is without the use of any cementing material or mortar between the brick, the isothermal planes are determined by the heat penetration both from the surface exposed to the furnace temperature, and from the surfaces exposed to the heat which penetrates between the brick. In a construction of this kind, therefore, each brick is exposed to heat on five faces and the isotherms form a curved surface which is closest to the surface of the brick at the center of the exposed face. Since the movement of the brick is a product of the coefficient of expansion and the distance to which the heat penetrates, the exposed face of the brick will tend to assume a concave shape. There is not sufficient resiliency in the brick to withstand this strain, and spalling results.

Slag penetration occurs in the same fashion. Inasmuch as the slag which penetrates the brick changes the physical characteristics of the resulting body, the brick becomes a series of curved segments, each of which has different physical characteristics. These segments are affected differently by changes in temperature, and the brick becomes very susceptible to spalling under thermal shock.

On the other hand a furnace structure built of brick properly laid in a suitable cement will approach the condition obtained in a monolithic wall. The isotherms in such a structure form a plane surface parallel to the exposed face of the wall, and there is no tendency in the brick to attain a shape different from the original. The tendency to spalling is, therefore, minimized. Slag penetration produces a gradual change in composition, and hence in characteristics, in planes parallel to the surface of the original brickwork, and since each plane parallel to the original surface has specific characteristics, the tendency to spalling is minimized.

In metallurgical practice there are many variations between the extremes of brick work laid dry and brick work with properly cemented joints. In some cases the cement is applied by pouring it as a thin slip over the top surfaces of the horizontal courses and allowing it to flow into the vertical joints. This method probably gives good horizontal joints, but a cement slip thin enough to flow into a vertical joint is also thin enough to flow out, leaving the vertical joint open to thermal and slag penetration. In other cases the cement is applied by dipping into the cement the surfaces of the brick to be covered, and in still other cases the cement is applied to the brick surfaces with a trowel. In every installation in which a cement is used, several items of expense are added to the cost. These items include the material cost of the cement, the labor cost of applying the cement, and the time required for applying the cement. Further, since each joint is a separate and distinct application of the cement there is no control over the uniformity of the joints.

It is therefore among the objects of this invention to apply to refractory shapes an adhering, protective, cementatory coating of uniform thickness and gravity which will (1) reduce the cost of furnace wall construction by eliminating the material cost of the cement, (2) reduce the time for construction by eliminating the labor of applying the cement and permitting the same rapidity of installation possible in dry walls, and (3) permit the construction of a furnace lining having uniform and perfectly cemented joints.

The coating can be applied either to fired or unfired brick, but it is applied to the brick in the condition in which the brick are to be used. In other words, brick intended for use in the unfired state are coated after drying, and brick intended for use in the fired state are coated after firing. The coatings are applied to the individual shapes in substantially uniformly thick layers so that the brick may be laid with accuracy.

The base materials used in the manufacture of the coatings are varied with the composition of the body to which they are applied. Each coating must properly bond, in service, the body to which it is applied, and the bonding effect is preferably obtained by chemical combination of the base material of the coating with the refractory body or with a component of the refractory body. Further, on heating in place, the coating must attain physical characteristics in accordance with the service the brick is expected to render.

Other objects and advantages of the invention will be seen from the following description in which the composition of the coating is given as well as methods of application outlined, and examples of the coatings are described.

The coating of this invention comprises ingredients or constituents falling in the following groups: an insoluble base material; a suspension vehicle therefor; a water-soluble bonding material; a water-repellant; and a protective colloid. The particular ingredient used from each group depends upon particular circumstances, and one ingredient may possibly be used that has the functions or meets the requirements of more than one group.

For instance, an insoluble base may be used of iron, iron ore, periclase, chrome ore, or possibly mixtures thereof. For a water repellant there may be used rosin, tar, pitch, asphalt, or possibly mixtures thereof. As suspension vehicles, there may be used water, a drying oil, tar, grease, or possibly certain mixtures thereof. As a protective colloid, there may be used, a starch product. And as a water soluble bond, among others, there may be used alone or in certain admixture, soluble chlorides and sulphates; hydrochloric, sulphuric or phosphoric acids; sodium hydroxide and sodium silicate.

The coating may be applied to either fired or unfired brick in various ways. In one method the pressed brick is taken from the dryer at the proper temperature for dipping into a hot plastic mass of tar, rosin and the coating base material. The thickness of the coating is controlled by the consistency of the hot bath. After dipping and cooling, the brick is properly coated. If very thick coatings are desired, the dipping is repeated after the first coating has been cooled. Instead of dipping, the hot coating mass may be applied by spraying, troweling or painting. In another method the brick is dipped into a bath in which the coating base material is suspended in tar at a temperature above the melting point of the tar, the temperature of the brick being controlled so that a predetermined thickness of coating is retained on the brick, after which the brick is cooled. Paraffine grease may also be used as a suspension medium, in conjunction with the tar, or the tar and rosin of the previous methods.

In another method the coating base material is in an aqueous suspension, and in this suspension may be included such materials as sodium silicate solution, boiled starch or soluble starch as a protective colloid, ferrous sulphate, ferrous chloride, ammonium chloride, magnesium oxide, sulphur, clay, various acids or other materials as needed for the desired formula. The bricks are dipped in the suspension and dried, and the thickness of the coating is controlled by the consistency of the suspension, or by the number of dipping and drying cycles. Such a suspension may also be applied by brushing or spraying.

The protection of refractory shapes from the disintegrating effects of moisture by means of a substantially waterproof coating is one of the objects of this invention. To this end the coating must not only in itself be resistant to the action of moisture, but it must be substantially free from cracks and breaks which would permit the passage of water through the coating to the body. This object is accomplished by the addition to the coating mixture of a finely divided water insoluble low melting material, such as rosin, pitch, or tar, which will become sufficiently fluid at the drying temperature to seal the pores and cracks which would normally develop, but which will not adversely affect the characteristics of the coating in regard to brittleness or softness under the conditions encountered prior to burning in service.

Still another method of preparing the coating comprises a suspension of the base material in a drying oil, such as linseed oil, into which the brick is dipped, after which the coating is allowed to harden on the brick by air or oven drying.

Coatings containing magnesium oxide may be suspended in water containing boiled starch, and after the brick have been dipped into the suspension and partially dried, they are given a second dip into a magnesium chloride solution, or into dilute hydrochloric acid or dilute sulphuric acid, so that on drying a magnesium oxychloride or magnesium oxysulphate bond is formed.

Other methods lie in the use of the reactions used in organic chemistry to make the so-called plastics. For example, the coating material may be suspended in a phenol solution into which the brick is dipped, and then causing a reaction between the phenol and an aldehyde to form a condensation product to cement the coating to the brick.

Naturally the base material from which the coating is made must be such that it will supply the proper bonding qualities to the shape to which it is applied. Examples of mixtures applicable to brick composed of magnesia or periclase, either fired or unfired, follow:

*Example 1*

| | Parts by weight |
|---|---|
| Powdered metallic iron | 5000 |
| 36° Baumé sodium silicate solution | 2000 |
| Boiled tapioca starch | 50 |
| Sodium hydroxide | 50 |

*Example 2*

| | Parts by weight |
|---|---|
| Powdered metallic iron | 5000 |
| Sodium silicate | 1000 |
| Boiled tapioca starch | 50 |
| Sodium hydroxide | 50 |
| Water | 1000 |

*Example 3*

| | Parts by weight |
|---|---|
| Ferric oxide | 5000 |
| 36° Baumé sodium silicate solution | 2000 |
| Boiled tapioca starch | 50 |
| Sodium hydroxide | 50 |

*Example 4*

| | Parts by weight |
|---|---|
| Ferric oxide | 5000 |
| Sodium silicate | 1000 |
| Boiled tapioca starch | 50 |
| Sodium hydroxide | 50 |
| Water | 1000 |

*Example 5*

| | Parts by weight |
|---|---|
| Powdered metallic iron | 1000 |
| Periclase | 250 |
| Rosin | 62.5 to 125 |
| Sodium silicate | 250 |
| Sodium hydroxide | 75 |
| Boiled starch | 40 |
| Water | 625 |

*Example 6*

| | Parts by weight |
|---|---|
| Ferric oxide | 1000 |
| Periclase | 250 |
| Rosin | 62.5 to 125 |
| Sodium silicate | 250 |
| Boiled starch | 75 |
| Water | 625 |

*Example 7*

| | Parts by weight |
|---|---|
| Powdered metallic iron | 1000 |
| Periclase | 250 |
| Rosin | 62.5 |
| Sodium silicate | 500 |
| Sodium hydroxide | 75 |
| Boiled starch | 60 |
| Water | 650 |

*Example 8*

| | Parts by weight |
|---|---|
| Ferric oxide | 1000 |
| Periclase | 250 |
| Rosin | 62.5 |
| Sodium silicate | 500 |
| Sodium hydroxide | 75 |
| Boiled starch | 40 |
| Water | 375 |

The solid materials in the above mixtures should be in such a state of division that they will all pass a No. 40 Bureau of Standards screen, and preferably so that they will all pass a No. 100 Bureau of Standards screen.

Mixtures of iron oxide or of powdered iron with linseed oil, with plaster of Paris, with ammonium sulphate, with ammonium chloride, with ferrous chloride, with ferrous sulphate, with sulphur, and with combinations of the above have also yielded satisfactory coatings for magnesia or periclase bodies, and the scope of this invention is not limited to the preferences cited.

Examples of mixtures applicable to chromite refractories, either fired or unfired, follow:

Example 9

| | Parts by weight |
|---|---|
| Chrome ore | 72 |
| Dead burned periclase | 21 |
| Sodium silicate | 5 |
| Amijel | 2 |

The above mixture, ground so that it passes a Number 40 Bureau of Standards screen, and preferably so that it passes a Number 100 Bureau of Standards screen, is suspended in water, or preferably in a caustic soda solution of such concentration as to add approximately 2.5 parts by weight of sodium hydroxide to the above formula, the amount of water used varying with the thickness of the coating desired. The brick are dipped and dried as described under the process for coating magnesia refractories. In this mixture it is preferable to use heat treated recrystallized chromite, as described in U. S. Patent No. 2,028,017 granted to Gilbert E. Seil, January 14, 1936.

Example 10

| | Parts by weight |
|---|---|
| Chrome ore | 79 |
| Sodium silicate | 10 |
| Kaolin | 10 |
| Amijel | 1 |

The above mixture, ground so that it passes a Number 40 Bureau of Standards screen, and preferably to pass a Number 100 Bureau of Standards screen, is suspended in water, or preferably in a caustic soda solution of such concentration as to add approximately 2.5 parts by weight of sodium hydroxide to the above formula, and the coating is applied as in the case of Example 9.

The addition of 6 to 12 parts by weight of a water insoluble low melting material, such as tar, pitch, or rosin to the mixtures given in Examples 9 and 10 increases the waterproofing qualities of the coating obtained.

In sodium silicate solutions, the sodium silicate has a tendency to dissociate in the presence of magnesium oxide. This tendency is retarded by the addition of sodium hydroxide to the solution and I have taken advantage of this fact in the mixes described.

When a furnace wall constructed with the coated units of this invention is heated for the first time in service, a series of non-reversible reactions takes place, resulting in the formation of a refractory mortar which will properly bond the construction units. Consider, for instance, a furnace wall constructed of magnesite brick coated with the mixture described in Example 8. As the wall is heated above atmospheric temperature, the water repellent material (that is, the rosin), is driven off at low red heat. Within this range of temperatures the sodium silicate and the hydrated magnesium oxide provide bonds which hold the coating in place. As the temperature is increased above 1200° F. the sodium silicate melts, the molten silicate reacting with the periclase to form magnesium silicates which eventually become forsterite. The soda is volatilized at very high temperatures. The coating base material, (that is, the ferric oxide) is absorbed by, and reacts with, the magnesium oxide of the coating mixture and of the brick, forming magnesio-ferrite spinel, resulting in an interface between the coating and the brick, and yielding a heat resisting and slag resisting mortar.

For clay refractories the coatings are made with clay bases, for aluminum silicate refractories such as mullite suitable base materials for the coating material are used, and other special refractories require a coating, the base material of which meets the specification herein set forth.

In the drawing there will be seen a coated refractory brick manufactured according to an embodiment of the present invention, as well as fragmentary views of a furnace wall constructed in accordance with features of the invention, the wall being shown both before and after firing.

The brick of Fig. 1 comprises a body portion 5 which may be either in the fired or unfired state and which may be formed from any suitable refractory material such as fire clay, magnesite, chromite, etc. The body portion 5 is shown as completely covered with a relatively thin coating 6 which may be applied to the brick in any of the manners hereinbefore described or in any other suitable fashion. Obviously, the coating 6 may be compounded according to any of the formulae hereinbefore described or may be of any other composition suitable for the purposes of protecting the body portion 5 and which may acquire the characteristics of mortar or cement when heated to a predetermined degree.

Figure 2:
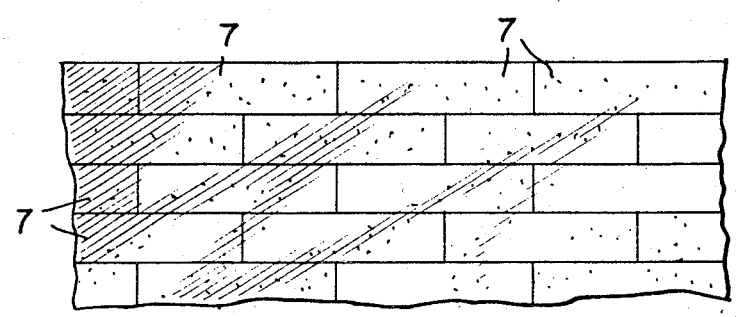
Fig. 2 is a view in elevation of a furnace wall, laid or constructed with refractory bodies of the present invention, and shown before firing.
Figure 3:
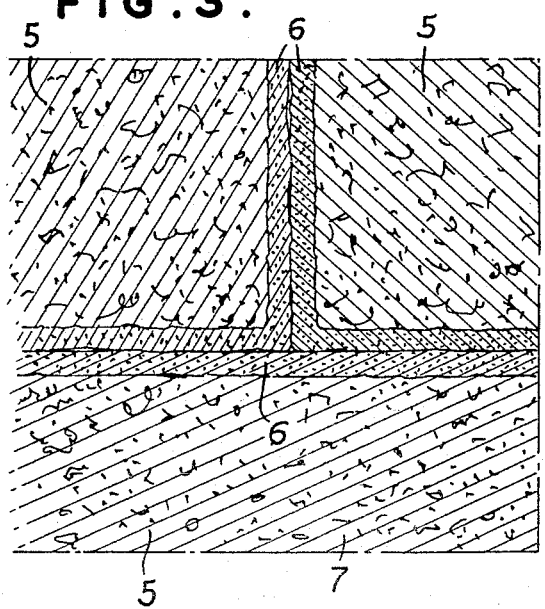
Fig. 3 is an enlarged sectional view of the wall before firing.
Figure 4:
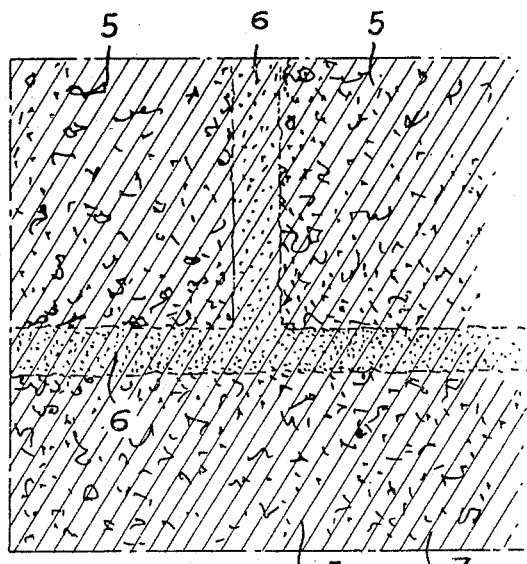
Fig. 4 is an enlarged sectional view of the wall after firing.

Fig. 2 shows a part of a furnace wall which may be laid up or constructed with a plurality of bricks 7, some or all of which are coated with a cementatory adhering coating in accordance with features of the invention. The wall shown in Fig. 2 is constructed merely by placing the bricks 7 into position, one upon another, row by row, without the application of any mortar or cement whatsoever between the contacting faces and edges of the adjoining bricks. An enlarged cross section of a part of the wall shown in Fig. 2 will be seen in Fig. 3. In this view will be seen the body portion 5 of three adjoining bricks and the coating 6 upon each brick is readily observed.

Having been laid up in the manner just described, the furnace is now put into use or heated internally in any desired manner. As the heat is increased, a series of non-reversible reactions take place as hereinbefore described, resulting in the coatings 6 becoming in the nature of a plastic mortar. In this state the coating material of adjoining bricks melts together and intermingles to become finally one homogeneous mass which, upon further heating, becomes fused and permanently solid. At the same time this material fuses with each face or side of the body portion 5 resulting in an interface with the body portion so that the body portion and the coating become practically a homogeneous entity. The wall has now become fused practically into one homogeneous mass and possesses the appearance and attributes of a monolithic wall or at least of one constructed laboriously and expensively through the use of applied cement when constructing the wall.

Having thus described, and having given examples characteristic of this invention, to which methods and examples the invention is by no means limited, it is claimed:

1. A refractory construction unit having a dried but unfired, water-proof and cementatory adhering coating which coating includes a water insoluble base.

2. A refractory construction unit having a dried but unfired, water-proof and cementatory adhering coating, the base of which is an iron bearing substance.

3. A refractory construction unit having a dried but unfired, water-proof and cementatory adhering coating, the base of which is chrome ore.

4. A refractory construction unit having a dried but unfired, water-proof and cementatory adhering coating, the base of which is a mixture of chrome ore and periclase.

5. A refractory construction unit having a dried but unfired, water-proof and cementatory adhering coating which coating includes a water insoluble base, and a water soluble bond.

6. A unit according to claim 5 with the addition of a protective colloidal material.

7. A unit according to claim 5 with the addition of a suspension vehicle for said base.

8. A refractory construction unit having a dried but unfired, water-proof and cementatory adhering coating, the base of which includes a substance chosen from the group comprising iron bearing compounds, chrome ore and periclase, said coating being adapted to bond, after firing in service, the construction unit to which it is applied, by chemically combining with a component of the construction unit.

GILBERT E. SEIL.